United States Patent [19]

Leicht

[11] Patent Number: 4,764,535

[45] Date of Patent: Aug. 16, 1988

[54] THERMALLY APPLIED SEALANTS AND PROCESS

[75] Inventor: Larry F. Leicht, Keller, Tex.

[73] Assignee: Q'SO, Inc., Saginaw, Tex.

[21] Appl. No.: 637,718

[22] Filed: Aug. 6, 1984

[51] Int. Cl.[4] ................................................ C08J 9/34
[52] U.S. Cl. ........................................ 521/51; 521/91; 521/139; 524/271; 524/451
[58] Field of Search ...................... 521/51, 84, 139, 91; 524/271, 451, 490, 491

[56] References Cited

U.S. PATENT DOCUMENTS

| 2,666,036 | 1/1954 | Schwencke et al. | |
| 3,427,269 | 2/1969 | Davis | 524/271 |
| 3,519,585 | 7/1970 | Miller | 524/271 |
| 3,632,540 | 1/1972 | Unmuth et al. | |
| 3,743,605 | 7/1973 | La Clair | 521/91 X |
| 3,856,719 | 12/1974 | Miyamoto et al. | 260/2.5 HA |
| 3,929,686 | 12/1975 | Stevenson | 521/91 X |
| 3,993,613 | 11/1976 | Doss | 524/490 |
| 4,101,482 | 7/1978 | Doss | 524/271 |
| 4,369,284 | 1/1983 | Chen | 524/476 |
| 4,376,179 | 3/1983 | Agarwal | 524/451 |
| 4,377,655 | 3/1983 | Himes | |
| 4,497,912 | 2/1985 | Reese et al. | 521/139 X |
| 4,497,926 | 2/1985 | Toy | 524/271 |

FOREIGN PATENT DOCUMENTS

| 208636 | 8/1955 | Australia | 521/91 |
| 51-081866 | 7/1976 | Japan | 521/139 |

OTHER PUBLICATIONS

Bascom, R. C. "Cellular Elastomers" Rubber Age, p. 576, Jul., 1964.

Primary Examiner—Paul R. Michl
Attorney, Agent, or Firm—Richards, Harris, Medlock & Andrews

[57] ABSTRACT

Elastomer compositions suitable for use in foaming operations and elastomeric cellular products and processes of forming such products. The elastomer compositions comprise a mixture of two thermoplastic rubber compounds, at least one of which has a vinyl aromatic component and a higher aromaticity than the other rubber compound. The compositions also contains a nucleating agent which functions when gas is entrained in the molten elastomer formulation to enhance the neutrophilic structure of the elastomer. An unstable resin is also present in the elastomer compositions. This resin is oxidized or thermally decomposed as the foamed product is cured to produce a relatively nontactified skin. Cellular elastomeric products may be formed by incorporating an inert gas into the molten elastomer compositions by the use of gas infusing equipment or by the decomposition of blowing agents. The blowing agents may be supplied to the molten elastomer compositions entrained within a plasticizing oil.

14 Claims, No Drawings

THERMALLY APPLIED SEALANTS AND PROCESS

TECHNICAL FIELD

This invention relates to elastomer composition and more particularly to multicomponent elastomer compositions and their use in forming cellular elastomeric products by hot melt extrusion techniques.

BACKGROUND OF THE INVENTION

It is a common practice to blend polymeric rubber compounds with other compounds which may function as processing aids or impart desirable characteristics to the final product. Such other compounds include polymers which may be elastomers or non-elastomers, oils, plasticizers, and the like. For example, U.S. Pat. No. 3,632,540 to Unmuth et al discloses binary and ternary elastomer compositions based upon thermoplastic elastomeric block copolymers characterised as A-B-A copolymers. In this designation, the A and B blocks indicate nonelastomeric and elastomeric polymer blocks, respectively. As disclosed in Unmuth, the end blocks may take the form of alkenyl arenes and the elastomeric B block the form of polymerized conjugated dienes. The block copolymers may be "pure" block copolymers or "tapered" block copolymers. The elastomeric midblock sections can be formed essentially of any synthetic elastomer, preferably of an aliphatic conjugated diene, such as isoprene, methyl isoprene, butadiene, styrene-butadiene copolymers and butadiene-acrylonitrile. The elastomeric midblock sections may comprise copolymers of ethylene with $C_3$-$C_8$ monoolefins, preferably $C_3$-$C_6$ alpha olefins. As disclosed in Unmuth, suitable vinyl aromatic endblocks may be derived from styrene, vinyl toluene, vinylxylene, ethylvinylbenzene, isopropylstyrene, ethylvinyltoluene, tert.-butylstyrene or diethylstyrene. Copolymers containing at least 70 % weight vinylaromatics and 30% or less alpha-methylstyrene or esters of acrylic or methacrylic acid may also be employed.

The A-B-A type polymers thus described are blended with natural or synthetic waxes in the binary compound and, optionally in the ternary compounds, with certain resins which do not exhibit liquid-phase separation. Suitable waxes include natural or synthetic waxes such as paraffin wax, scale wax and polyalkylenes such as polyethylene, polypropylene, and blends and copolymers thereof. The resin in the ternary mixture is employed to enhance the blendability and viscosity of the block copolymer and wax mixture. Suitable resins include rosin, hydrogenated rosin, esters of rosin and hydrogenated rosin and dimerized rosin and esters thereof. Various other resins are also disclosed and, in addition, the elastomer compositions can contain other additives such as antioxidants, friction reducing additives, pigments and fillers, and various other synthetic rubbers, copolymers and homopolymers. The compositions may be employed in formulating coatings laminates, hot melt adhesives, and caulking compounds.

U.S. Pat. No. 4,369,284, to Chen discloses a gelatinous multicomponent elastomer composition based upon specific ABA triblock copolymers of the type disclosed generally in the aforementioned patent to Unmeth et al. Thus, Chen discloses a mixture of styrene-ethylene/butylene-styrene triblock copolymer and a plasticizing oil such as white petroleum oil or a synthetic liquid oligomer of polybutene, polypropene or polyterpene. The copolymer is characterized as having a styrene end block to ethylene/butylene center block ratio within the range of 31:69-40:60. A suitable copolymers is identified as Shell Chemical Company's Kraton G. 1651. Copolymers identified as Kraton G 1650 and G 1652 are characterized as too low in styrene content.

Yet another multicomponent elastomer mixture is disclosed in U.S. Pat. No. 4,377,655 to Himes. The composition, which is employed in molded shoe soles, is based upon a mixture of a linear ABA block copolymer and a radial $(A-B-)_xB-A$ block copolymer. The A blocks are monoalkynyl arene polymers having average molecular weights within the range of about 5,000–45,000 and the B blocks are elastomeric conjugated diene polymers having average molecular weights within the range of about 15,000–300,000. The compositions also contain a styrene-acrylonitrile copolymer and a vulcanized vegetable oil and may optionally contain a hydrocarbon rubber extending oil and a finely divided filler. The extending oils are characterized as paraffinic naphthenic oils having less than 30 weight % aromatics and viscosities within the range of about 100–500 SSU. Fillers which may be used include clay, talc, alumina, anhydrous silica, titaniumdioxide, carbon black calcium, calcium carbonate, and fibers such as polyester or acrylic fibers. The composition may also contain a minor amount of stearic acid.

U.S. Pat. No. 4,101,482 to Doss et al discloses a low tack sealant composition comprising a mixture of two block copolymers, modifying resin, and a filler. The block copolymers may be thermoplastic AB and ABA $(AB)_nY$ copolymers with A representing polyvinyl aromatic blocks and B poly conjugated diene blocks. Thus, the A blocks may be derived from styrene, methylstyrene, propylstyrene and vinylnaphthalene. The conjugated diene blocks are derived from $C_4$-$C_8$ monomers which include 1,3butadiene, isoprene, 1,3-pentadiene, 2,4-hexadiene and 3-ethyl-1,3-pentadiene. The polymers preferably have A/B weight ratios within the range of 40/60-15/85. The modifying resin employed in the formulation is a normally solid resin such as a modified or unmodified rosin or rosin ester, esters of polymerized rosin, polyterpene resins, terpenephenolic resins, coumaroneindene resins, diolefinolefin resins, phenol-aldehyde resins, alpha-methyl styrene copolymers. Plasticizers include polyolefins such as polybutene, naphthenic, paraffinic or aromatic oils, various esters, and chlorinated hydrocarbons. Fillers disclosed in Doss et al include calcium carbonate, aluminum silicate, clay, talc, kaolin, barytes, mica, silica and mixtures thereof. Carbon black and titanium dioxide may also be added as pigments. The formulation may also include sterically hindered phenols and other antioxidants and antiozonants as stabilizers.

Many elastomeric polymers are readily subject to foaming to form cellular rubber products that may be either open celled or closed celled. Such products and their preparation are discussed by Bascom, R.C. "Cellular Elastomers" Rubber Age p. 576, July, 1964. Closed-celled products are employed in gaskets and other similar packing products since the void volume of the product is predominantly in the form of a discrete cells disposed throughout the product so that it is a relatively impermeable to gas flow. The cellular rubber products may be formed by decomposition of "blowing agents" such as halocarbons, e.g. trichlorofluoromethane, azodicabonate and hydyazine, or by the direct aeration of the molten rubber stock with an inert gas. In either case, nitrogen will usually be employed as the infusing gas in order to avoid loss of internal gas to the atmosphere.

U.S. Pat. No. 2,666,036 to Schwenke discloses a process of producing cellular rubber like products employing resins which are not in themselves elastomeric. Thus, the Schwence process involves the foaming of a liquid formulation of polyvinylchloride homopolymers or copolymers in a plasticizer oil which also contains a water insoluble salt of a fatty acid containing from 12 to 22 carbon items, specifically aluminum stearate. The foam is cured to provide a cellular plastic similar to rubber products such as sponge rubber or foam rubber.

U.S. Pat. No. 3,856,719 to Miyamoto et al discloses a process for producing foamed thermoplastic resin articles which are characterized as having good flexibility and elasticity. The product is produced from a formulation of low-density and high density polyethylene, together with a polystyrene type resin. This includes a mixture of polystyrene as the main component together with a rubbery polymer containing at least 50 % by weight of polystyrene or a copolymer of styrene with diene monomers, such as styrene-butadiene copolymer. Miyamoto also discloses use of nucleating agents to provide the desired cell size of the famed product. Suitable nucleating agents include a finely divided inorganic substances such as talc, clay, diatomaceous earth and silica. Also disclosed are organic substances such as the salt of citric acid and sodium bicarbonate which generate gases upon decomposition or chemically change at the extrusion temperature.

DISCLOSURE OF THE INVENTION

In accordance with the present invention there is provided a new and improved elastomer composition which may be subject to a foamed extrusion procedure to produce an elastomeric cellular product. The elastomer composition of the present invention comprises a mixture of two thermoplastic rubber compounds. At least one of the thermoplastic rubber compounds has a vinyl aromatic component. This thermoplastic rubber compound has a high aromaticity relative to the other rubber compound. The composition contains in addition a nucleating agent and an unstable deteackifying resin. The nucleating agent functions, when gas is entrained in the molten formulation, to enhance the neutrophilic structure of the elastomer. The unstable resin is oxydized or thermally decomposed as the extruded composition is cured to form a nontactified skin i.e., a skin on the product having low tack.

In a preferred embodiment of the invention, the elastomer composition comprises a normally liquid plasticizing oil. The preferred plasticizer is polybutene which is present in a concentration greater than the concentration of at least one of the thermoplastic rubber compounds. Preferably the elastomeric composition also contains a minor amount of trans-polyoctenylene rubber, a polymer of cyclooctene having prevalently transisomeric double bonds.

In a further aspect of the invention there is provided in an elastomeric product having an internal material phase comprised of a mixture of two thermoplastic rubber compounds as described above and having gas cells dispersed within the internal phase to provide a cell volume of at least ten volume percent. In addition, the surface phase of the product is formed of a non-tackified skin.

In a more specific embodiment of the invention, one of the thermoplastic rubber compounds is a styrene-ethylene/butylene-styrene triblock copolymer and the other is a styrene-ethylene/propylene block copolymer. The styrene content of the styrenethylene/propylene copolymer is substantially greater than the styrene content of the triblock copolymer. The unstable resin is selected from the group consisting of aliphatic hydrocarbon resins, aromatic hydrocarbon resins, and mixtures thereof having a bromine number of at least 20.

In yet another aspect of the invention, there is provided a process for the production of elastomeric cellular products by heating the elastomer composition to a molten state and incorporating an inert gas into the heated composition to produce a foamed molten elastomer. The molten foam is extruded onto a solid substrate and cured to produce the solid elastomeric product having a detackified skin. In a further embodiment of the invention, the inert gas is incorporated into the molten elastomer composition by the decomposition of a blowing agent entrained within a plasticizing oil supplied to the molten composition.

BEST MODES FOR CARRYING OUT THE INVENTION

The present invention provides elastomer compositions which are especially well suited for use in the formation of cellular elastomeric products, particularly packing products such as are employed in gasket sponge rubber and sealant applications. These formulations are particularly adapted for use in hot melt extrusion applications. These techniques are conventionally used in the applications of foamed adhesives as described, for example, in Bak, DJ, "Foaming Action Improves Adhesive Performance," Design News 26, 1980.

The basic ingredients in the elastomeric compositions of the present invention are a mixture of at least two thermoplastic rubber compound's, a nucleating agent, and an unstable detackifying resin. The rubber compounds which are referred to herein as the "first" and "second" rubber compounds are characterized in that the first is highly elastomeric relative to the second whereas the second rubber compound, which has a vinyl aromatic component, has a high aromaticity relative to the first compound. Thermoset elastomeric polymers may also be present in the formulation provided that their degradation temperatures are higher than the temperatures at which the thermoplastic polymers are melted and processed in the application procedure.

Preferably, the first thermoplastic rubber compound is a triblock polymer of the type disclosed in the aforementioned patents to Unmuth et al and Doss et al for, example, and which has a relatively high elastomer content. More specifically it is preferred that the elastomer content be greater than the endblock content. An especially preferred thermoplastic elastomer in this regard is a styrene-ethylene/butylene-styrene triblock copolymer which the ratio of the center elastomer block to the styrene endblocks is greater than one and preferably greater than two. A suitable triblock copolymer for use in this regard is available from Shell Chemical Company under the trademark Kraton G-1652. This polymer has a ethylene/butylene centerblock to styrene endblock ratio of about 2.4.

Another thermoplastic elastomer suitable for use as the first rubber compound is ethylene/propylene rubber, commonly referred to as EPR. Such ethylene/propylene copolymers generally exhibit an ethylene to propylene ratio within the range of about 1-3 and are highly elastic. Other suitable rubbers for the first thermoplastic compound are ethylene/propylene terpolymers (commonly referred to as EPDM) which include a diene in addition to the ethylene/propylene monomers. Suitable dienes include nonconjugated open-chained diolefins and cyclic dienes.

Other thermoplastic rubber compounds suitable for use in the invention include isobutylene-isoprene copolymers, commonly termed butyl rubbers, and copolymers of butadiene and styrene, commonly referred to as styrene-butadiene rubber (SBR). The ratio of butadiene to styrene should normally be greater than 2:1. In addition, the first thermoplastic elastomer compound can be neoprene or a silicone rubber gum. The former normally should not be used if polyvalent metal soaps e.g., aluminum sterate as described hereinafter, are employed in the formulation. Acrylic rubber elastomers may also be used as the first thermoplastic polymer.

The second component is a thermoplastic elastomer having a vinyl aromatic component and a high aromaticity relative to the first component. A preferred thermoplastic polymer for use in this regard is a styrene-ethylene/propylene block copolymer having a ratio of ethylene/propylene to styrene of less than two. A suitable styreneethylene/propylene block copolymer for use as the second component is Kraton GX-1701 from Shell Chemical Company. Other suitable copolymers having relatively high styrene contents which can be used to resist compression set may also be employed in the invention.

The two thermoplastic rubber compounds may be employed in the formulation in any suitable concentrations which will vary depending upon the desired properties of the final product and also the additional components, as described below, which are used in the formulation. Normally the first rubber compound will be present in a concentration within the range of 5–40 weight percent and the second compound present in a concentration within a range of 2–25 weight percent. In most applications the first, more rubbery resin will be present in a concentration which is equal to or greater than the concentration of the second polymer. In some cases, however, the concentration of the second thermoplastic compound may be greater than that of the first compound. In a broad aspect of the invention, the weight ratio of first polymer to second polymer may range from about 20 to about 0.4. Considering the more rubbery first thermoplastic polymer as the basic rubber, the second polymer concentration, expressed in terms of parts per hundred rubber (pphr), preferably is within the range of about 5–100.

The nucleating agent employed in the present invention may be any compatible agent which will enhance the neutrophilic structure of the molten elastomer formulation when gas is entrained therein. Specifically the nucleating agent may take the form of colloidal solid dispersed within the elastomer composition including colloidal silicates, carbon black and the like which will add to the volume structure of the foamed elastomer faster than it increases the weight per gallon. The nucleating agent normally will be present in an amount ranging from about ¼% up to about 5% by weight of the elastomer composition. Based in terms of the basic rubber component, the nucleating agent may be present in an amount within the range of 5–100 pphr. A suitable nucleating agent for use in the present invention is hydrous magnesium silicate available from Cyprus Industrial Minerals Co. under the trademark Mistron Monomix. In addition to or as an alternati.-ve to the use of colloidal nucleating agent, the elastomer composition of the present invention may contain the metal salt of an aliphatic acid which functions as a lipophilic gelling agent. Such salts may take the form of alkali metal, alkaline earth metal, or trivalentmetal salts of $C_{12}$–$C_{22}$ fatty acids as described in the aforementioned patent to Schwencke. Examples of such salt include aluminum stearate, lithium stearate and calcium stearate. These gelling agents act to provide slump control and hold the closed cell bubble structure within the foamed composition as it cools down from the elevated temperature at which it is applied.

The unstable detackifying resin may be any suitable resin which oxidizes or decomposes thermally, either by itself or in conjunction with a drying agent as described hereinafter, to act as a skinning agent on the surface of the extruded product. Thus, the product when cured has an internal phase which is in the nature of a tacky mastic whereas the skin is in a relatively non-tackified condition. Suitable resins include unstable forms of resins which are commonly employed in blocked copolymer systems to affect adhesion, hardness, viscosity and surface temperatures. The resins are sufficiently unsaturated to exhibit a bromine number of about 20 or more and preferably a bromine number of about 40 or more. Preferred detackifying resins include aliphatic hydrocarbon resins, aromatic hydrocarbon resins, and mixtures thereof characterized as noted above by a bromine number of at least 20. Such resins may be employed in amounts ranging from, about 5–40 wt% and about 10–200 ppnr. Other detackifying resins, which usually will be employed in combination with an aliphatic hydrocarbon resin or an aromatic hydrocarbon resin or both, are unsaturated esters of polymerized rosins.

A suitable unstable resin is a $C_5$ aliphatic hydrocarbon resin available under the trademark SB-100-2 from Sunbelt Chemicals, Inc. Another suitable detackifying resin is a $C_{-9}$ aromatic hydrocarbon resin available from Sunbelt Chemicals under the designation SB-1400. A suitable polymerized rosin ester, which preferably is used with one of the unstable aliphatic or aromatic resins is available from Hercules' Inc. under the trademark Dymerex.

Another surface skinning agent which may be employed in the present invention preferably in conjunction with an aliphatic or aromatic hydrocarbon resin is a hydrogenated methyl ester of rosin. While this material, when completely hydrogenated will not oxidize, it functions through decarboxylation to form rosin oil which migrates to the surface of the product carrying with it some of the colloidal nucleating agent. This aids in rendering the surface tack free. A suitable hydrogenated rosin ester is available form Hercules Inc. under the trademark Hercolyn D. This material may be employed in a concentration within the range of about 2–10 weight percent. Another nonstable resin useful in reducing surface tack is zinc resinate in a concentration of about 2–25 weight percent. This product is available from Reichhold Chemical Company under the trademark Zitro.

In addition to the previously described ingredients, it usually will be preferred to incorporate a normally liquid plasticizer into the formulation. In a broad sense, this may be of any plasticizer of the type normally employed in rubber compounding which is compatible with the other ingredients. The plasticizer may be present in a concentration within the range of 2 to about 40 wt%. A preferred concentration range is within the range of 20-200 pphr. Preferably, the plasticizer is added to the composition in an amount to provide a concentration which is greater than the concentration of at least one of the thermoplastic rubber compounds. Preferred plasticizers for use in the present invention are liquid silicon rubber and polybutene. Polybutene is especially preferred. It is desirable to use a polybutene having an average molecular weight within the range of 1800-40,000. This product is a liquid at room temperature having a viscosity of about 500 to 200000 cp. The presence of the second thermoplastic rubber compound tends to retain the polybutene plasticizer in the system and enables the use of relatively large quantities of polybutene, preferably in an amount greater than the concentration of the more rubbery thermoplastic polymer.

Yet another preferred ingredient used in the elastomer composition of the present invention is trans-polyoctenyle-ne rubber (TOR). This polymer is a metathesis polymer of cyclooctene with prevalently trans-isomeric double bonds as contrasted with cisisomeric double bonds. For a more detailed description of TOR, reference is made to Draxler, A, "A New Rubber: trans-polyoctenamer" Elastomerics, Feb. 1983, pp. 16-20. A suitable form of TOR is available from the Huels Corporation, New York, under the trademark Vestenamer 8012.

The use of TOR in the present invention is desirable in that it performs a number of functions other than simply as a process aid as it is conventionally used in rubber compounding. The TOR functions with the second thermoplastic polymer to retain the polybutene or other plasticizers within the system. Thus it enables relatively high concentrations of plasticizers to be employed without migration out of the system. In addition, the TOR improves the internal viscosity and flowability of the composition in the hot-melt form without reducing the melt point. It also functions in conjunction with the unstable resin to remove the surface tack of the extruded composition. The TOR is employed in a relatively minor amount usually less than about 10 wt%. Greater amounts, up to about 20 wt%, can be used and the TOR can be thermally cross linked at a temperature greater than the melt point.

Other ingredients which may be employed to advantage in the present invention include boiled linseed oil and a hydrocarbon oil such as white mineral oil. The mineral oil functions as a processing aid and to prevent undue wear on the pumping equipment used in foaming and extruding the product. It also migrates to the surface of the extrudate with the nucleating agent. The linseed oil acts to reduce the intrinsic viscosity of the thermoplastic rubber compounds and to promote the formation of a uniform closed cell bubble structure. The mineral oil may be used in amounts up to about 10 weight percent of the composition. The boiled linseed oil normally will be present in smaller amounts, typically less than 1 weight percent.

Another additive useful in formulating the compositions of the present invention is solid amorphous polypropylene. The polypropylene acts in conjunction with the polybutene or other plasticizers to prevent slumping and to aid in the encapsulation of the gas within the system at the time the foam is produced. It also functions to increase the cohesive strength and elongation characteristics of the final product. Depending upon the desired characteristics of the final product, the amorphous polypropylene can be used in relatively large amounts to provide a concentration of up to about 50 weight percent. Substantially smaller amounts, down to about 5 weight percent or even less may also be used. A suitable polyproplene product for use in the present invention is available from Baychem International, Inc. under the trademark K-TAC 100. This product is an atactic amorphous polypropylene having an average molecular weight of about 2800.

In addition to the unstable resins described previously, other products may also be used in arriving at detackification of the skin of the final product. In this regard, minor amounts of a drying agent can be employed. The drying agent is present in a very small concentration, typically within the range of 0.01-0.1 weight percent. A suitable drying agent for use in this regard is cobalt napthanate available from Manchem Incorporated under the trademark Manobond C-16. This product increases oxidation of the unstable resins identified above at the temperatures at which the foamed product is extruded.

Synthetic waxes such as may be derived from esters of fatty acids may also be used to reduce the surface tack of the final product. Concentrations ranging from about 1-20% may be employed. A suitable wax derived from fatty acid esters in Paricin 220 available from CasChem, Inc.

The elastomer compositions of the present invention can be foamed and extruded to the desired configuration of the final product by any suitable technique. They are readily usable in gas infusing hot melt applicators such as those available from the Nordson Corporation under the trademark Foammelt. Nitrogen preferably will be used as the infusing gas in order to maintain internal pressure in the closed cell configuration. Typically the foaming operation may be at temperatures within the range of 320°-420° F. at gas infusion pressures within the range of 4-40 psig.

The use of the elastomer compositions of the present invention in "foamed in place" applications offers a number of advantages. They will solidify very quickly under ambient temperature conditions after being applied in the molten state. This minimizes the need for off line storage and obviates the cleanup operations and scrap disposal which are employed with slow curing formulations. As will become apparent from the examples given hereinafter, the elastomer compositions of the present invention may be formulated so that they skin over rapidly upon application, or they may skin slowly over periods of of hours or even days. In the latter case, the foamed products can be skinned rapidly upon the application of high intensity ultraviolet radiation.

The products have melt points ranging from about 240° F. to about 500° F. They exhibit good long term heat stability at temperatures ranging from about 190° to 500° F.

Elastomer compositions formulated in accordance with the present invention are set forth in the following examples. In a first set of the elastomer composition, the formulations were based upon styrene-ethylene/butylene-styrene triblock copolymers and styrene-ethylene/propylene block copolymers, as described above, and also contained aluminum stearate, a sterically hindered phenol antioxidant (2,2 methylene bis (4-methyl-6-tertiary pentyl phenol), white mineral oil, atatic amorphous polypropylene, polybutene, and C$_5$-aliphatic hydrocarbon resin. In addition some compositions contained as optional ingredients a C$_9$ aromatic hydrocarbon resin and a phenolic resin oil as described above.

A typical formulation procedure involves heating and mixing the ingredients in a high speed disbursement mixer. Thus, a suitable procedure includes the addition of a portion of the C$_5$ aliphatic hydrocarbon resin to a portion of the polybutene heated to a temperature of 125° F. Thereafter the amorphous polypropylene is added with mixing and the mixture heated to a temperature of about 240° F. The remainder of the aliphatic

TABLE I

| Component | Concentration, wt % | | | | |
|---|---|---|---|---|---|
| | 1 | 2 | 3 | 4 | 5 |
| A | 1.7 | 2.1 | 2 | 1.8 | 1.7 |
| B | 0.7 | 0.2 | 0.2 | 0.2 | 0.1 |
| C | 3.7 | 4.5 | 4.2 | 4 | 3.7 |
| D | 14.7 | 17.6 | 16.6 | 15.7 | 13.6 |
| E | 3.7 | 4.8 | 4.6 | 4.3 | 3.7 |
| F | 18.4 | 21.8 | 21.5 | 19.4 | 17 |
| G | 25 | 18.3 | 17.3 | 16.3 | 30 |
| H | 18.4 | 30.7 | 34.7 | 38.2 | 30.2 |
| I | 7 | | | | |
| J | 7 | | | | |

TABLE II

| Typical Test Data | 1<br>Q-55 | 2<br>Q-55-10 | 3<br>Q-55-20 | 4<br>Q-55-30 | 5<br>Q-55-40 |
|---|---|---|---|---|---|
| Color | G-2 | G-4 | G-4 | G-4 | G-5 |
| Taste | None | None | None | None | None |
| Odor | None | None | None | Very Slight | Slight |
| Weight/Gallon | 7.8 | 7.8 | 7.8 | 7.8 | 7.7 |
| Water Resistance | Excellent | Excellent | Excellent | Excellent | Excellent |
| Heat Resistance For 2 Weeks @ 190° F. | No Effect | No Effect | No Effect | No Effect | No Effect |
| Melt Point Ball & Ring | 295° F. | 285° F. | 280° F. | 260° F. | 240° F. |
| Heat Stability After 24 Hours @ 350° F. | −20% | −18% | −18% | −18% | −12% |
| Solids Content | 98.5 | 98.5 | 98.4 | 98.3 | 98.2 |
| Shelf & Service Life | 20 yrs. | 20 yrs. | 20 yrs. | 20 yrs. | 20 yrs. |
| Plasticizer Migration | None | None | None | None | None |
| Adhesive Tensile (Peel) | 3 PLI | 5 PLI | 8 PLI | 10 PLI | 12 PLI |
| Aging Characteristics | Slight haze on surface | Slight haze on surface | Slight haze on surface | Slight haze on surface | Slight haze on surface |
| MBMA Water Damming Test | Passes | Passes | Passes | Passes | Passes | hydrocarbon resin is then added with continued mixing. The antioxidant is then added followed by the styrene-ethylene/butylene-styrene block copolymer. As the triblock copolymer is added, the heat is turned off and the mixture allowed to cool. During cooling, the styrene-ethylene/propylene block copolymer is added over a prolonged period of time during which the temperature falls to a near room temperature. Thereafter the aluminum stearate and white mineral oil are added in sequence. The remainder of the polybutene is then added and mixing continued until a homogeneous blend is obtained. Where the optional C$_9$ aromatic hydrocarbon resin and the phenolic resin are employed, these ingredients are added after the addition of the final batch of aliphatic hydrocarbon resin and before addition of the antioxidant. The formulation sequence described above is not considered to be critical, but is simply one suitable technique of producing the elastomer composition.

Table I sets forth the relative concentrations in wt% of ingredients in 5 elastomer compositions prepared in accordance with the above procedure. In Table I the formulations are identified as formulations 1–5 and the ingredients are designated as follows: aluminum stearate-A, antioxidant-B, white mineral oil-C, styrene-ethylene/butylene-styrene triblock copolymer-D, styrene-ethylene/propylene block copolymer-E, amorphous polypropylene-F, polybutene-G, aliphatic hydrocarbon resin-H, aromatic hydrocarbon resin-I, and phenolic resin oil-J. Typical physical characteristics for the formulations set forth in Table I are set forth in Table II.

These products are capable of retaining an open, pressure-sensitive mastic status for periods ranging up to 24 hours in the case of formulation number 1. Alternatively, they may be "skinned" in a manner of minutes by the application of high intensity ultraviolet light.

A second group of elastomer compositions were prepared which skinned over at the application temperature almost immediately without the application of ultraviolet light. These formulations included the components identified above as ingredients A through I and in addition contained one or more of the ingredients identified as follows: boiled linseed oil-J, polymerized rosin ester-K, cobalt naphthanate-L and fatty acid ester wax-M, all as described previously.

For this set of compounds, a mixing protocol similar to that described above may be followed with the polymerized resin ester and C$_9$ aromatic hydrocarbon resin added after the antioxidant and the the mineral oil and the fatty acid ester wax added respectively before and after the aluminum stearate. The boiled linseed oil and cobalt napthanate may be added after the final batch of polybutene during the final mix phase.

Elastomer compositions formed in accordance with this procedure as set forth in Table III below with components A–I designating the ingredients as described above with respect to the formulations of Table I and the remaining ingredients designated as noted. The formulations set forth in Table III have somewhat higher melt points, about 340° F., and better heat stability at 350° F. than those shown in Table I. These formulations may be foamed and applied at a temperature within the range of about 340°–360° F. whereas those shown in Table I should be applied at temperature within the range of about 325°–350° F.

TABLE III

| Components | Concentration, Wt % | |
|---|---|---|
| | 6 | 7 |
| A | 2.5 | 2.5 |
| B | 1.0 | 1 |
| C | 3.8 | 3.8 |
| D | 20.6 | 20.1 |
| E | 5 | 5.0 |
| F | 18 | 18.1 |
| G | 10 | 10 |
| H | 25.1 | 12.6 |
| I | 10.0 | 10 |
| J | | 0.3 |
| K | | 12.6 |
| L | | 0.03 |
| M | 4 | 4 |

An additional elastomeric composition embodying the present invention is somewhat similar to composition number 5 (Table I) and contains in addition a hydrogenated methyl ester of rosin and hydrous magnesium silicate nucleating agent, both of which have been described previously and are identified herein by the legends O and P, respectively. This formulation contains in addition a high tensile mastomeric available from Q'SO Inc. Saginaw, Texas, under the trademark Q-202. This component, which is employed only as a pigmentation agent is identified herein by the legend R. This product is set forth in Table IV and identified as composition No. 8. This product is capable of maintaining a pressure sensitive mastic status after cooling for a period of several days, and like those shown in Table I can be "skinned" almost immediately by the application of high intensity ultraviolet light. Its physical characteristics are similar to those set forth in Table II except that it has a higher adhesive tensile strength (12 PLI) and a somewhat lower tensile strength. It exhibits 2500% elongation at its breaking point.

Another composition embodying the present invention includes the ingredients identified previously by the legends A through G, O, P and R, and in addition contains the zinc resinate described previously and identified herein by the legend S. This composition is set forth in Table IV as product No 9. It exhibits a high melting point, about 340° F, and sets up upon cooling to provide a detackified skin surface.

TABLE IV

| Components | Concentration, Wt % | |
|---|---|---|
| | 8 | 9 |
| A | 1.5 | 1.7 |
| B | 0.1 | 0.9 |
| C | 3.4 | 3.3 |
| D | 13.6 | 22.3 |
| E | 5.1 | 9 |
| F | 16.3 | 13.6 |
| G | 25.5 | 17.1 |
| H | 28.8 | |
| O | 3.1 | 9.4 |
| P | 1.4 | 1.7 |
| R | 1.4 | 4.1 |
| S | | 17.1 |

Yet a further embodiment of the present invention may prepared employing the previously described block copolymer and triblock copolymer mixture together with a colloidal nucleating agent polybutene, unstable resin, lithium stearate and the methathesis polymer of cyclooctene as described previously. An example of this formulation identified herein as product No. [b 10 [1 is set forth in Table V. Ingredients D, E, G, H and P are as described previously and the lithium stearate and polycyclooctene are indicated by legends T and U, respectively.

TABLE V

| Components | Concentration, wt % |
|---|---|
| D | 23.9 |
| E | 6.4 |
| G | 40.6 |
| H | 13.8 |
| P | 5.2 |
| T | 3.5 |
| U | 6.7 |

This composition produces a detackified skin immediately upon cooling and exhibits physical characteristics similar to those observed for composition no. 9.

As noted previously, the elastomeric composition of the present invention may be employed to form packing products such as gaskets and seals. The compositions are particularly well suited to "foamed in place" applications. The foamed hot-melt may be placed on a substrate surface and a second conforming surface then brought into place and into contact with the hot-melt before it is cured, thus shaping the gasket as it cures to the desired configuration. An example of this application is in the formation of a gasket on an automobile fender when a frame for a tail light lens or the like is applied to the fender. Other applications involve the formation of seals for closures on containers, vibration dampeners, and bedding seals for windows and doors.

After formulating the elastomer composition of the invention by any suitable technique such as the mixing protocol described previously, the molten product may be poured into a suitable storage container where it is allowed to solidify. When the product is to be used, it is heated to a temperature sufficient to convert the solid elastomer composition to the molten state. Normally the elastomer composition will be heated to a temperature of at least 275° F. and at which it exhibits a viscosity within the range of about 500–150,000 centiposes. Viscosities within this range are suitable for foaming applications. After heating the elastomer composition to the desired temperature, an inert gas is incorporated into the molten composition by any suitable technique such as through the use of a hot-melt infusor as described previously. The gas should be entrained in the molten composition to provide an amount within the range of 20–70 volume per cent based upon the volume of the liquid composition. Thereafter the heated foamed product is extruded onto the desired substrate material and then cured to form a solid elastomeric product having a detackified skin.

Blowing agents can also be employed in foaming the elastomer compositions to arrive at the final product. A preferred mode of incorporating a foaming agent in accordance with the present invention involves the use of a heat actuated foaming agent entrained in a plasticizing oil of the type described previously. Thus, the elastomer composition may be heated to the desired hot-melt application temperature which is above the decomposition temperature of the blowing agent and applied to a suitable extrusion device. A solution of the blowing agent in plasticizing oil at a lower temperature below the decomposition temperature of the blowing agent, e.g., room temperature, is concomitantly applied to the extrusion device where it is mixed with the heated elastomer composition. As the blowing agent is incorporated within the molten elastomer composition and heated, it undergoes decomposition with the attendant generation of foaming gas.

It usually will be preferred to entrain the foaming agent in the same plasticizing oil as used in the elastomeric composition, and to reduce the plasticizing oil concentration in the elastomer composition accordingly so that when the two feeds are mixed the desired plasticizer concentration is arrived at in the hot foamed product. For example, and with reference to product number 10 described previously, the polybutene concentration in the elastomer product may be reduced by half and the equivalent amount of polybutene, then used as a carrier fluid for the blowinc agent. A suitable blowing agent for use in this regard is azodicarbonamide available from Uniroyal Chemical Company under the trademark Celogen AZ. Thus, with reference to product number 10, 80 parts of the elastomer composition (with the polybutene concentration reduced by half) may be heated to a temperature of about 400° F and applied to the extrusion system. 20 parts by weight of polybutene at room temperature and containing the blowing agent in a suitable concentration, e.g., about 2 weight percent, may then be applied to the extrusion device where it is mixed with the elastomer composition. If desired, the polybutene feed may be preheated so long as its temperature remains below the decomposition temperature of the blowing agent. In any case, upon mixing of the polybutene solution with the melted elastomer product, the blowing agent decomposes with the generation of the inert gas to form the foamed cellular product.

Having described specific embodiments of the present invention, it will be understood that modifications thereof may be suggested to those skilled in the art, and it is intended to cover all such modifications as fall within the scope of the appended claims.

I claim:

1. In an elastomer composition, the mixture comprising:
    (a) a first thermoplastic rubber compound which is more elastomeric than the second compound recited in paragraph (b);
    (b) a second thermoplastic rubber compound having a vinyl aromatic component, said second thermoplastic rubber compound having a high aromaticity relative to said first thermoplastic rubber compound;
    (c) a nucleating agent for enhancing the neutrophilic structure of said elastomer composition upon the entrainment of gas therein;
    (d) an unstable detackifying resin, and
    (e) said composition containing a closed cell void volume of at least 10 volume %.

2. In an elastomer composition, the mixture comprising:
    (a) a styrene-ethylene/butylene-styrene triblock copolymer thermoplastic rubber compound which is more elastomeric than the compound recited in paragraph (b);
    (b) a styrene-ethylene/propylene block copolymer thermoplastic rubber compound having a styrene content greater than the styene content of said styrene-ethylene/butylene-styrene copolymer providing a high aromaticity relative to said triblock copolymer;
    (c) a nucleating agent for enhancing the neutrophilic structure of said elastomer composition upon the entrainment of gas therein, and
    (d) an unstable detackifying resin.

3. The composition of claim 1 wherein said polybutene is present in said mixture in an amount greater than the concentration of at least one of said thermoplastic rubber compounds.

4. The composition of claim 1 wherein said closed-cell void volume is within the range of 20–70 volume percent.

5. The composition of claim 2 further comprising a plasticizing oil.

6. The composition of claim 2 wherein said plasticizing oil is polybutene.

7. The composition of claim 6 wherein said nucleating agent comprises a colloidal solid dispersed within said composition.

8. The composition of claim 7 wherein said nucleating agent is hydrous magnesium silicate.

9. The composition of claim 6 further comprising a minor amount of trans-polyoctenylene rubber.

10. The composition of claim 9 further comprises amorphos/polypropylene.

11. The combination of claim 2 wherein said composition further comprises an oil selected from the group consisting white mineral oil and linseed oil and mixtures thereof.

12. The composition of claim 2 further comprising a minor amount of cobalt naphanate.

13. The composition of claim 2 further comprising a minor amount of polymerized rosin ester.

14. The composition of claim 2 wherein said mixture further comprises a minor amount of an antioxidant.

* * * * *